(12) United States Patent
Jones et al.

(10) Patent No.: US 7,010,566 B1
(45) Date of Patent: Mar. 7, 2006

(54) SYSTEM FOR CONTROLLING TRANSMISSION OF INFORMATION ON THE INTERNET

(75) Inventors: Jeffrey Allen Jones, Round Rock, TX (US); Aaron Keith Reed, Austin, TX (US); Douglas Scott Rothert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/232,212

(22) Filed: Jan. 19, 1999

(51) Int. Cl.
*G06F 15/16* (2006.01)

(52) U.S. Cl. ............. 709/203; 709/216; 709/217; 709/232

(58) Field of Classification Search ............... 709/203, 709/227, 216, 217, 232, 104, 228, 229; 718/104
See application file for complete search history.

(56) References Cited

U.S. PATENT DOCUMENTS

| | | | |
|---|---|---|---|
| 5,623,601 A | 4/1997 | Vu ..................... | 395/187.01 |
| 5,644,711 A | 7/1997 | Murphy ............... | 395/188.01 |
| 5,678,041 A | 10/1997 | Baker et al. .......... | 395/609 |
| 5,708,780 A | 1/1998 | Levergood et al. .... | 395/200.12 |
| 5,712,979 A * | 1/1998 | Graber et al. | |
| 5,717,860 A | 2/1998 | Graber et al. | |
| 5,724,522 A * | 3/1998 | Kagami et al. | |
| 5,732,214 A * | 3/1998 | Subrahmanyam | |
| 5,734,831 A | 3/1998 | Sanders ............... | 395/200.53 |
| 5,740,252 A * | 4/1998 | Minor et al. | |
| 5,768,519 A | 6/1998 | Swift et al. .......... | 395/200.53 |
| 5,796,952 A | 8/1998 | Davis et al. .......... | 395/200.54 |
| 5,805,803 A | 9/1998 | Birrell et al. ......... | 395/187.01 |
| 5,815,657 A * | 9/1998 | Williams et al. ...... | 713/200 |
| 5,875,296 A | 2/1999 | Shi et al. ............. | 395/188.01 |
| 5,898,830 A * | 4/1999 | Westinger, Jr. et al. | |
| 5,956,483 A * | 9/1999 | Grate et al. | |
| 5,987,454 A * | 11/1999 | Hobbs | |
| 5,999,740 A * | 12/1999 | Rowley | |
| 6,006,034 A * | 12/1999 | Heath et al. | |
| 6,021,439 A * | 2/2000 | Turek et al. | |
| 6,199,204 B1 * | 3/2001 | Donohue | |
| 6,282,709 B1 * | 8/2001 | Reha et al. .......... | 717/175 |

FOREIGN PATENT DOCUMENTS

| | | |
|---|---|---|
| EP | 0875844 | 11/1998 |
| JP | 10-257048 | 9/1998 |
| WO | WO 99/0096 | 1/1999 |

OTHER PUBLICATIONS

IBM Research Disclosure 41460, "Extra Transaction Suppression during Web Browser Collaboration", Oct. 1998, p. 1375.

IBM Technical Disclosure Bulletin, "Persistent Context for World Wide Web Browsers", vol. 40, No. 02, Feb. 1997, pp. 215-216.

(Continued)

*Primary Examiner*—Saleh Najjar
*Assistant Examiner*—Michael Won
(74) *Attorney, Agent, or Firm*—Duke W. Yee; Jeffrey S. LaBaw; Stephen R. Tkacs

(57) ABSTRACT

In an Internet processor, it is determined when a potential transmission of information over an Internet connection is about to occur. When a transmission is about to occur, a message is displayed to the user setting forth the information about to be transmitted, and indicating the address of the Internet server to which the information is about to be transmitted. The user of the Internet processor is given the option of canceling the transmission or continuing with the transmission.

21 Claims, 2 Drawing Sheets

OTHER PUBLICATIONS

Mayer, "Internet Privacy. The Internet and Privacy Legislation: Cookies for a Treat?", Computer Law and Security Report, vol. 14, No. 3, pp. 166-174, May-Jun. 1998, ABSTRACT.

Helling, "Web-Site Sensitivity to Privacy Concerns: Collecting Personally Identifiable Information and Passing Persistent Cookies", First Monday, vol. 3, No. 2, Feb. 2, 1998, ABSTRACT.

Highland, "Cookie Monster [Data Privacy]", EDPACS, vol. 24, No. 6, pp. Dec. 16-18, 1996, ABSTRACT.

Tichenor, "JavaScript Cookies", Dr. Dobb's Journal, vol. 22, No. 5, pp. 42-45, May 1997, ABSTRACT.

* cited by examiner

SYSTEM FOR CONTROLLING TRANSMISSION OF INFORMATION ON THE INTERNET

This invention relates to Internet security and more particularly to a system for providing an Internet user with the ability to make informed decisions regarding Internet security.

BACKGROUND OF THE INVENTION

The Internet has become a very popular method of acquiring information and providing a user with a convenient method of shopping from his home or place of business. When an Internet user "goes on line", he makes a connection through his server to the Internet and has the capacity of accessing the universe of web pages accessible from the Internet. When a user with an Internet processor accesses a web page, an Internet connection is made to the Internet server of the web page and the web page document is transmitted to the Internet processor of the user where the web page document is displayed. The user may then be asked for information by the accessed web page. Generally, an Internet processor can communicate with an Internet server to which it is connected by Internet connection by either sending data to the web page server in batches or messages or by posting data to the Internet server. As used herein, the word "transmit" and "transmission" is used to refer to both the sending of data and the posting of data. If the web page is a commercial web site offering a product for sale, the web page document may ask the user to furnish a credit card number in order to complete the transmission. Normally, when a web page asks for private information or information that is normally maintained secret, such as a credit card number, the transmission of the information is set up as a secured transmission wherein the information transmitted by the user is encrypted. In order to protect the user from inadvertent disclosure of private information, the user is typically warned by a message on the screen of his Internet processor when information is about to be transmitted in an unsecured transmission and the user is given the opportunity to cancel the transmission of the information before the information is transmitted in the unsecured transmission. The user, however, is not notified as to where the information is being transmitted or what information is being transmitted in the unsecured transmission. Accordingly, it is sometimes difficult for the user to make an informed decision as to whether or not to cancel the transmission. The user may be expected to know what web page he has accessed and what information he has selected to be transmitted to the web page, but he has to rely on his memory of the information when is warned of the unsecured transmission in making the decision of whether to cancel the transmission or not. Moreover, it is possible for the web page to which the user has made an Internet connection to obtain additional data from the user's Internet processor without the knowledge of the user and also to transmit acquired information to another server or web site. In addition, the server of a web page to which an Internet processor is connected by means of an Internet connection can operate the Internet processor to send messages composed at the server to other sites on the Internet. Such messages will bear the address of the Internet processor from which the message was transmitted as if the user of that Internet processor had composed and transmitted the message. Unscrupulous persons having access to the Internet have used this capability to transmit hate mail and pornography to third parties wherein it appears that the hate mail or pornography is being sent from a targeted Internet processor and the transmission occurs without the knowledge of the owner or user of the Internet processor. The above described problems of a server obtaining information from the user's Internet processor without the consent of user and of sending messages from the user's Internet processor to third parties, can occur in secured and unsecured transmissions. Accordingly, there is a need to provide the Internet processor with better control over the sending and posting of data over the Internet.

SUMMARY OF THE INVENTION

The present invention seeks to overcome the above described problems by providing information to the Internet processor user when information is about to be transmitted over the Internet to an Internet server. Specifically, a message is displayed on the monitor of the Internet processor, whenever information is about to be transmitted, indicating the Internet address to which the information is being transmitted and the content of the information being transmitted. The Internet user is then given the option to cancel the transmission or to allow the transmission to proceed. Because the Internet user is given the Internet address to which the information is being transmitted as well as the content of the information, the user is given the information he needs to make an informed decision as to whether or not to allow the transmission of information.

Instead of providing the user with merely the option to transmit the information or not transmit the information, the user can also be given the option of transmitting some of the information and canceling the transmission of other parts of the information. For example, if the information being transmitted is a credit card number, a password and the Internet address of the Internet processor, the user can select which of these, if any, he wants to transmit.

BRIEF DESCRIPTION OF THE DRAWINGS

The foregoing and other objects, aspects and advantages will be better understood from the following detailed description of a preferred embodiment of the invention with reference to the drawings, wherein.

DETAILED DESCRIPTION OF THE PREFERRED EMBODIMENT

Figure 1:
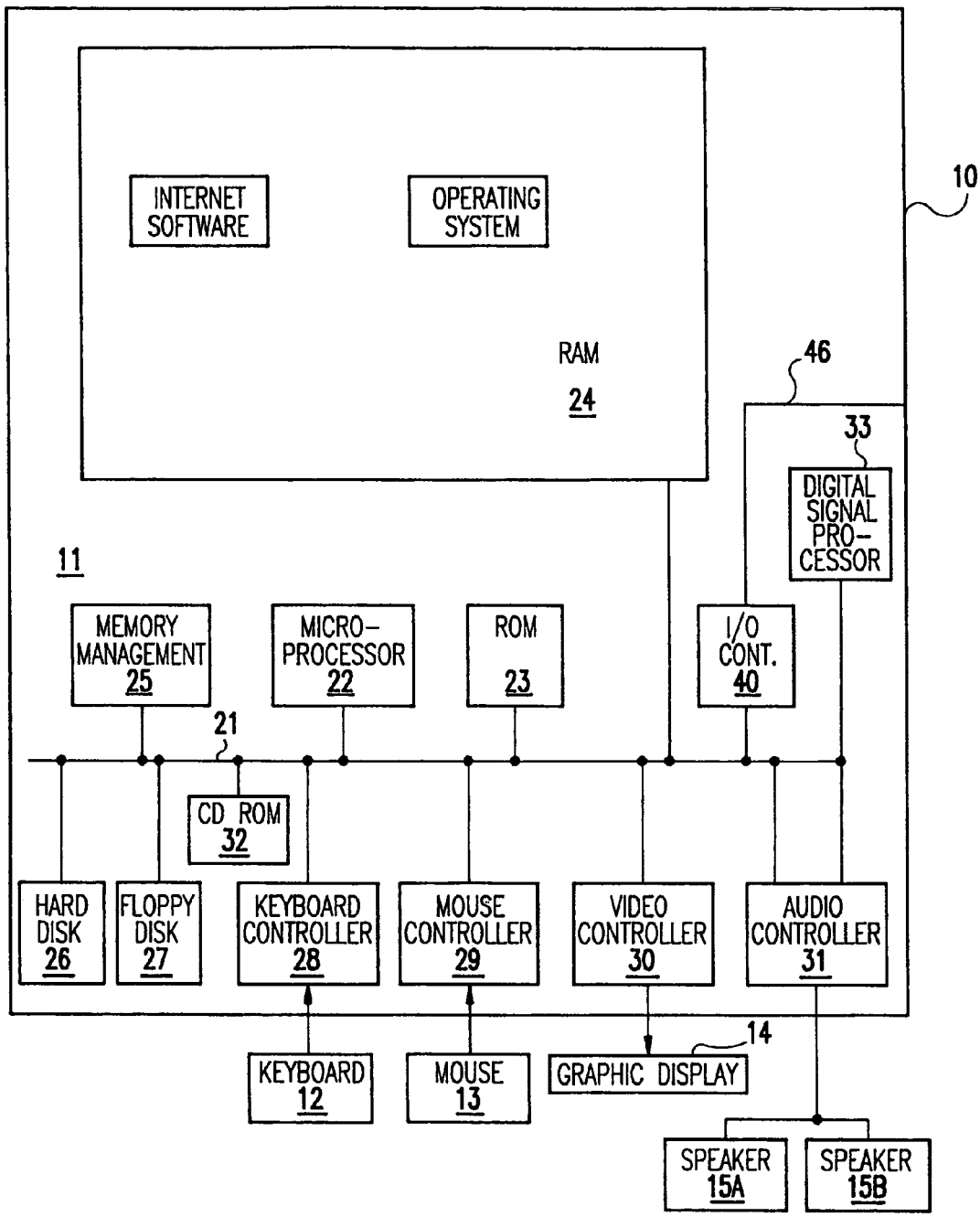
FIG. 1 is a block diagram showing the components of a personal computer in which the system of the present invention is used.

The system of the present invention may run on any Internet processor and typically will be used on a personal computer having a capability for Internet connections as shown in FIG. 1. In FIG. 1, the personal computer is designated by the reference No. 10 and comprises a system unit 11, keyboard 12, a mouse 13 and a graphics display 14, which is referred to as a monitor. The system unit 11 includes a system bus or plurality of system buses 21 to which various components are coupled and by which communication between the various components is accompanied. The microprocessor 22 is connected to the system bus 21 is and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors, such as the 68000, 68020 or the 68030 microprocessors and various Reduced Instruction Set Computer (RISC) microprocessors, such as the PowerPC chip manufactured by IBM may be used. Other RISC chips made by Hewlett Packard, Sun, Motorola and others may be used in the specific computer.

The ROM 23 contains, among other codes, the Basis Input-Output System (BIOS) which controls basic hardware operations, such as the interaction of the processor and the disk drives and the keyboard. The RAM 24 is the main memory into which the operating system and application programs are loaded. The memory management chip 25 is connected to the system bus 21 and controls direct memory access operations including passing data between the RAM 24 and hard disk drive 26 and floppy disk drive 27. The CD-ROM 32 also coupled to the system bus 21 is used to store a large amount of data, e.g., a multimedia program or presentation.

Also connected to this system bus 21 are various I/O controllers: the keyboard controller 28, the mouse controller 29, the video controller 30, the audio controller 31, and the digital signal processor 33. As might be expected, the keyboard controller 28 provides the hardware interface for the keyboard 12, the mouse controller 29 provides the hardware interface for mouse 13, the video controller 30 is the hardware interface for the graphic display device or monitor 14, and the audio controller 31 is the hardware interface for the speakers 15. An I/O controller 40, such as Token Ring Adapter, may be included to enable communication over a network 46 to other similarly configured data processors.

One of the preferred implementations of the invention is as sets of instructions comprising Internet software resident in the random access memory 24 of the computer 10. Alternately, the set of instructions may be stored in another computer readable memory, for example, in the hard disk drive 26, or in a removable memory, such as an optical disk for eventual use in the CD-ROM 32 or in a floppy disk for eventual use in the floppy disk drive 27. Further, the set of instructions can be stored in the memory of another computer and transmitted in a transmission medium over a local area network, such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Figure 2:
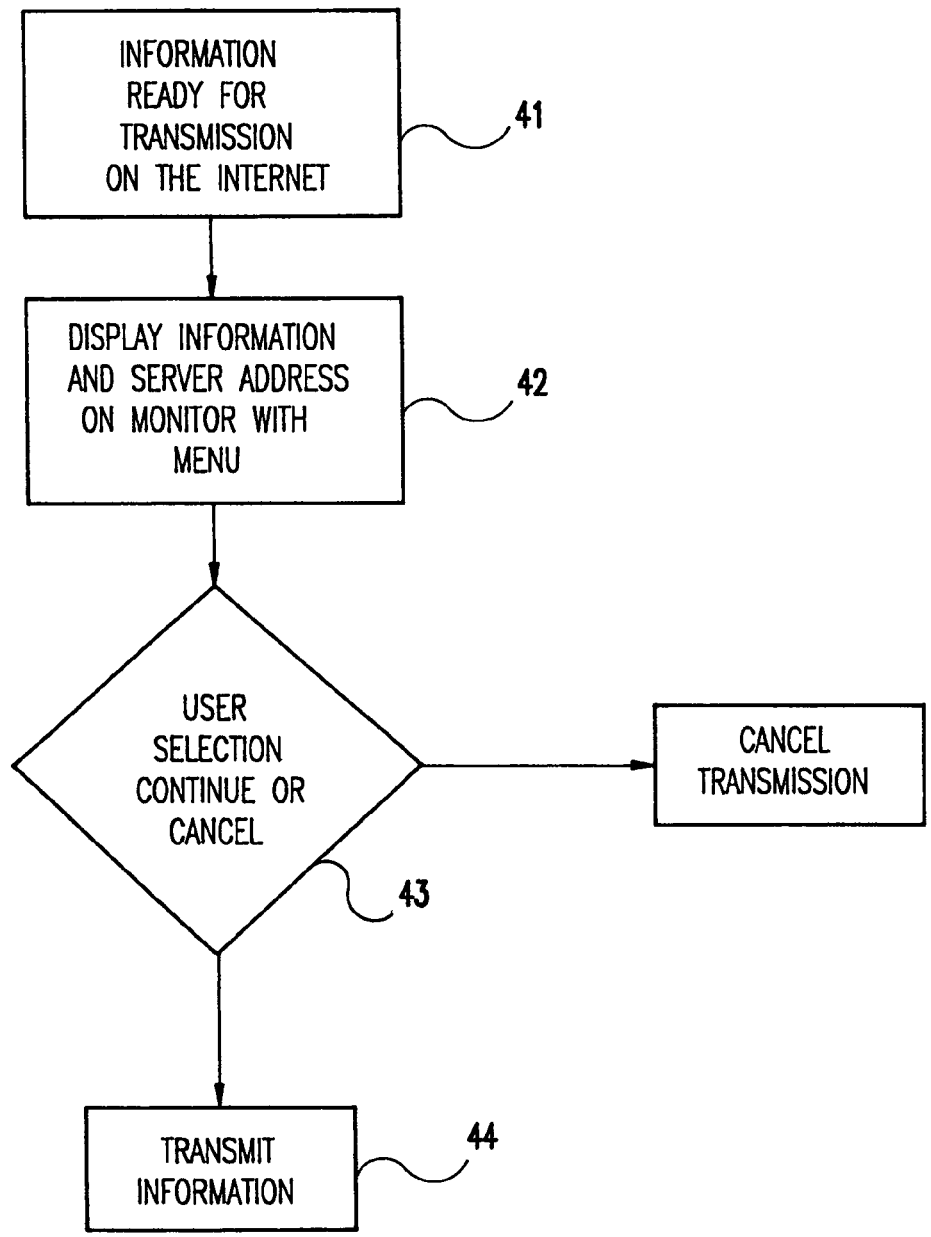
FIG. 2 is a flow chart illustrating the software and method of the present invention.

The present invention is incorporated in the Internet software, which includes the TCP/IP protocol and a browser. The program of the invention comes into operation when the computer 10 has made connection to a web page over the Internet and is about to transmit information to a server over the Internet. The server may be the web page server or it may be another server to which an Internet connection is made as a result of the computer being connected to a web page server. As shown in FIG. 2, which is a flow chart of the process of the invention, the Internet software is ready to transmit information assembled by the computer 10 to a server over the Internet in step 41. The computer 10 enters step 41 when it has received a signal to transmit information over an established Internet connection, which signal may or may not have been inputted by the user. When the browser tries to transmit the information, the computer enters step 42 in which the program generates a menu page with a message on the monitor of the Internet processor. The message contains the address of the web page server to which the information is being transmitted and sets forth the information about to be transmitted to the server. If the transmission is unsecured the message may also warn the user of this fact. In the preferred embodiment, the program searches the information to be transmitted and highlights data within the displayed information which is identified by the program as potentially sensitive. In addition, the user is given a menu selection in the display (a) to continue with the transmission, or (b) to cancel the transmission. While the message is displayed, the program waits in step 43 for the user selection. If the user then clicks on the continue button with his mouse, the program proceeds into step 44 to transmit the information and if the user clicks on the cancel button with his mouse, the program branches to step 45 to cancel the transmission.

An example of the display provided in accordance with the present invention when the information about to be sent is shown below.

```
+-----------------------------------------------------------------------------------------+
   Security Information
+-----------------------------------------------------------------------------------------+
   Server
   +--------------------------------------------------------------+
      Http://www.compusa.com/compusa/order_status.asp
   +--------------------------------------------------------------+
   Data
   +--------------------------------------------------------------+
      ORDER NUMBER = 1234567
      PASSWORD = xyzpdq
      USERID = TomFoolery
   +--------------------------------------------------------------+
   +--------------------------------------------------------------+
      Any information you submit is insecure and could be
      observed by a third party while in transit. If you are
      submitting passwords, credit card numbers, or other
      information you would like to keep private, it would
      be safer for you to cancel the submission.
   +--------------------------------------------------------------+
   [x] Show This Alert Next Time
         +-------------------------+         +-------------------------+
                    Continue                            Cancel
         +-------------------------+         +-------------------------+
+-----------------------------------------------------------------------------------------+
```

In the above example, the prospective transmission is unsecured and an appropriate warning is displayed to the user. In addition to notifying the user of the information to be transmitted and the server address to which the information is being sent, the display also gives the user the option of canceling the showing of the unsecured transmission alert the next time an unsecured transmission occurs. This option is provided by the legend "show this alert next time" with the selection box already designated with an "X". If the user does not want to show the alert next time, he deletes the X in this box.

The display provided to the user can also include a menu to permit the user to allow some of the information to be transmitted and some of the information to be withheld. An example of such a menu page is shown below:

```
+----------------------------------------------------------------------------------------------------+
    Security Information
+----------------------------------------------------------------------------------------------------+
    Server
    +-----------------------------------------------------------------------------+
       Http://www.compusa.com/compusa/order_status.asp
    +-----------------------------------------------------------------------------+
    Data
    +-----------------------------------------------------------------------------+
       [X] ORDER NUMBER = 1234567
       [X] PASSWORD = xyzpdq
       [X] USERID = TomFoolery
    +-----------------------------------------------------------------------------+
+----------------------------------------------------------------------------------------------------+
```

The default condition of this menu page shows the respective items of information as already selected and all the information will be transmitted if the user actuates the continue button. If the user wants to transmit just some of the information, he has to delete the from those boxes corresponding to the items of information which he does not want to transmit.

With the system of the invention as described above, whenever information is to be sent or posted from the user's Internet processor, the user is provided with the information of the server address and statement of the information being transmitted so that the user may make an informed decision as to whether or not he wants to transmit the information. In this manner, the user can protect himself against inadvertently disclosing private or secret information by transmitting such information and also prevent his Internet processor from being used to send messages or information to the third parties without his knowledge or consent.

The above description is of a preferred embodiment of the invention and modification of the invention may be made thereto without departing from the spirit and scope of the invention, which is defined in the appended claims.

The invention claimed is:

1. A method, in an Internet processor, for communicating over the Internet, the method comprising:
responsive to receipt of a signal to transmit information created automatically by a process resident on the Internet processor over an established Internet connection, identifying at least one information element within the information to be transmitted;
generating a message, wherein the message presents the at least one information element and includes a cancel control for canceling transmission, so that a user can determine whether the message should be sent; and
responsive to selection of the cancel control, canceling transmission of the information over the established Internet connection.

2. The method of claim 1, wherein the message includes a selection control for each information element disclosed in the message.

3. The method of claim 2, wherein each selection control is selected by default.

4. The method of claim 3, further comprising:
responsive to deselection of a selection control, blocking transmission of the information element corresponding to the deselected selection control.

5. The method of claim 2, further comprising:
responsive to manipulation of a selection control, blocking transmission of the information element corresponding to the selection control.

6. The method of claim 1, wherein the message presents the address of the Internet server to which the information is to be transmitted.

7. An apparatus, in an Internet processor, for communicating over the Internet, the apparatus comprising:
means, responsive to receipt of a signal to transmit information created automatically by a process resident on the Internet processor over an established Internet connection, for identifying at least one information element within the information to be transmitted;
means for generating a message, wherein the message presents the at least one information element and includes a cancel control for canceling transmission, so that a user can determine whether the message should be sent; and
means, responsive to selection of the cancel control, for canceling transmission of the information over the established Internet connection.

8. The apparatus of claim 7, wherein the message includes a selection control for each information element disclosed in the message.

9. The apparatus of claim 8, wherein each selection control is selected by default.

10. The apparatus of claim 9, further comprising:
means, responsive to deselection of a selection control, for blocking transmission of the information element corresponding to the deselected selection control.

11. The apparatus of claim 8, further comprising:
means, responsive to manipulation of a selection control, for blocking transmission of the information element corresponding to the selection control.

12. The apparatus of claim 7, wherein the message presents the address of the Internet server to which the information is to be transmitted.

13. A computer program product, in a computer readable medium, for communicating over the Internet, the computer program product comprising:

instructions, responsive to receipt of a signal to transmit information created automatically by a process resident on the Internet processor over an established Internet connection, for identifying at least one information element within the information to be transmitted;

instructions for generating a message, wherein the message presents the at least one information element and includes a cancel control for canceling transmission, so that a user can determine whether the message should be sent; and instructions, responsive to selection of the cancel control, for canceling transmission of the information over the established Internet connection.

14. The computer program product of claim 13, wherein the message includes a selection control for each information element disclosed in the message.

15. The computer program product of claim 14, wherein each selection control is selected by default.

16. The computer program product of claim 15, further comprising:

instructions, responsive to deselection of a selection control, for blocking transmission of the information element corresponding to the deselected selection control.

17. The computer program product of claim 14, further comprising:

instructions, responsive to manipulation of a selection control for blocking transmission of the information element corresponding to the selection control.

18. The computer program product of claim 13, wherein the message presents the address of the Internet server to which the information is to be transmitted.

19. A method, in an Internet processor, for communicating over the Internet, the method comprising:

responsive to receipt of a signal to transmit information created automatically by a process resident on the Internet processor over an established Internet connection, identifying at least one information element within the information to be transmitted, the at least one information element presence within the information to be transmitted being unknown to a user;

generating a message, wherein the message presents the at least one information element and includes a cancel control for canceling transmission, so that the user can determine whether the message should be sent; and responsive to selection of the cancel control, canceling transmission of the information over the established Internet connection.

20. An apparatus, in an Internet processor, for communicating over the Internet, the apparatus comprising:

means, responsive to receipt of a signal to transmit information created automatically by a process resident on the Internet processor over an established Internet connection, for identifying at least one information element within the information to be transmitted, the at least one information element presence within the information to be transmitted being unknown to a user;

means for generating a message, wherein the message presents the at least one information element and includes a cancel control for canceling transmission, so that the user can determine whether the message should be sent; and means, responsive to selection of the cancel control, for canceling transmission of the information over the established Internet connection.

21. A computer program product, in a computer readable medium, for communicating over the Internet, the computer program product comprising:

instructions, responsive to receipt of a signal to transmit information created automatically by a process resident on the Internet processor over an established Internet connection, for identifying at least one information element within the information to be transmitted, the at least one information element presence within the information to be transmitted being unknown to a user;

instructions for generating a message, wherein the message presents the at least one information element and includes a cancel control for canceling transmission, so that a user can determine whether the message should be sent; and instructions, responsive to selection of the cancel control, for canceling transmission of the information over the established Internet connection.

\* \* \* \* \*